United States Patent
Canton et al.

(10) Patent No.: US 11,728,468 B2
(45) Date of Patent: Aug. 15, 2023

(54) ANISOTROPIC EXPANSION OF SILICON-DOMINANT ANODES

(71) Applicant: Enevate Corporation, Irvine, CA (US)

(72) Inventors: Giulia Canton, Irvine, CA (US); Benjamin Park, Mission Viejo, CA (US); Fred Bonhomme, Lake Forest, CA (US); David J. Lee, Irvine, CA (US); Ian Browne, Orange, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 16/845,693

(22) Filed: Apr. 10, 2020

(65) Prior Publication Data

US 2021/0135190 A1  May 6, 2021

Related U.S. Application Data

(62) Division of application No. 16/674,224, filed on Nov. 5, 2019.

(51) Int. Cl.
 *H01M 4/134* (2010.01)
 *H01M 4/1395* (2010.01)
 (Continued)

(52) U.S. Cl.
 CPC ......... *H01M 4/134* (2013.01); *H01M 4/0435* (2013.01); *H01M 4/1395* (2013.01);
 (Continued)

(58) Field of Classification Search
 None
 See application file for complete search history.

(56) References Cited

U.S. PATENT DOCUMENTS

| | | | |
|---|---|---|---|
| 2009/0317721 A1* | 12/2009 | Shirane | H01M 4/134 429/231.95 |
| 2013/0022861 A1 | 1/2013 | Miyagi et al. | |

(Continued)

OTHER PUBLICATIONS

Notification of Transmittal of The International Search Report and the Written Opinion of the International Searching Authority, or the Declaration for International Application PCT/US20/57920, International Filing Date Oct. 29, 2020.
(Continued)

*Primary Examiner* — Yoshitoshi Takeuchi
(74) *Attorney, Agent, or Firm* — McAndrews, Held & Malloy, Ltd.

(57) ABSTRACT

Systems and methods for anisotropic expansion of silicon-dominant anodes may include a cathode, an electrolyte, and an anode, where the anode may include a current collector and an active material on the current collector. An expansion of the anode during operation may be configured by a metal used for the current collector, and/or a lamination process that adheres the active material to the current collector. The expansion of the anode may be more anisotropic for thicker current collectors. A thicker current collector may be 10 μm thick or greater. The expansion of the anode may be more anisotropic for more rigid materials used for the current collector. A more rigid current collector may include nickel and a less rigid current collector may include copper. The expansion of the anode may be more anisotropic for a rougher surface current collector.

8 Claims, 9 Drawing Sheets

(51) Int. Cl.
*H01M 4/74* (2006.01)
*H01M 10/0525* (2010.01)
*H01M 4/66* (2006.01)
*H01M 4/04* (2006.01)

(52) U.S. Cl.
CPC .......... *H01M 4/661* (2013.01); *H01M 4/745* (2013.01); *H01M 10/0525* (2013.01)

(56) References Cited

U.S. PATENT DOCUMENTS

| | | |
|---|---|---|
| 2013/0149605 A1 | 6/2013 | Kakehata et al. |
| 2013/0164611 A1 | 6/2013 | Nanba et al. |
| 2014/0170482 A1* | 6/2014 | Park ................. H01M 4/13 156/60 |
| 2014/0170498 A1 | 6/2014 | Park |
| 2018/0151884 A1* | 5/2018 | Yushin .............. H01M 10/0587 |
| 2018/0198114 A1* | 7/2018 | Bonhomme ........ H01M 4/0404 |
| 2019/0181434 A1 | 6/2019 | Lee et al. |
| 2019/0372088 A1 | 12/2019 | Bonhomme et al. |
| 2020/0313167 A1 | 10/2020 | Park et al. |

OTHER PUBLICATIONS

International Search Report And Written Opinion for PCT/US2022/021766, dated Jul. 26, 2022, 7 pages.

\* cited by examiner

ANISOTROPIC EXPANSION OF SILICON-DOMINANT ANODES

CROSS-REFERENCE TO RELATED APPLICATIONS/INCORPORATION BY REFERENCE

This application is a divisional application of application Ser. No. 16/674,224 filed on Nov. 5, 2019, which is hereby incorporated by reference in its entirety.

FIELD

Aspects of the present disclosure relate to energy generation and storage. More specifically, certain embodiments of the disclosure relate to a method and system for anisotropic expansion of silicon-dominant anodes.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for anisotropic expansion of silicon-dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
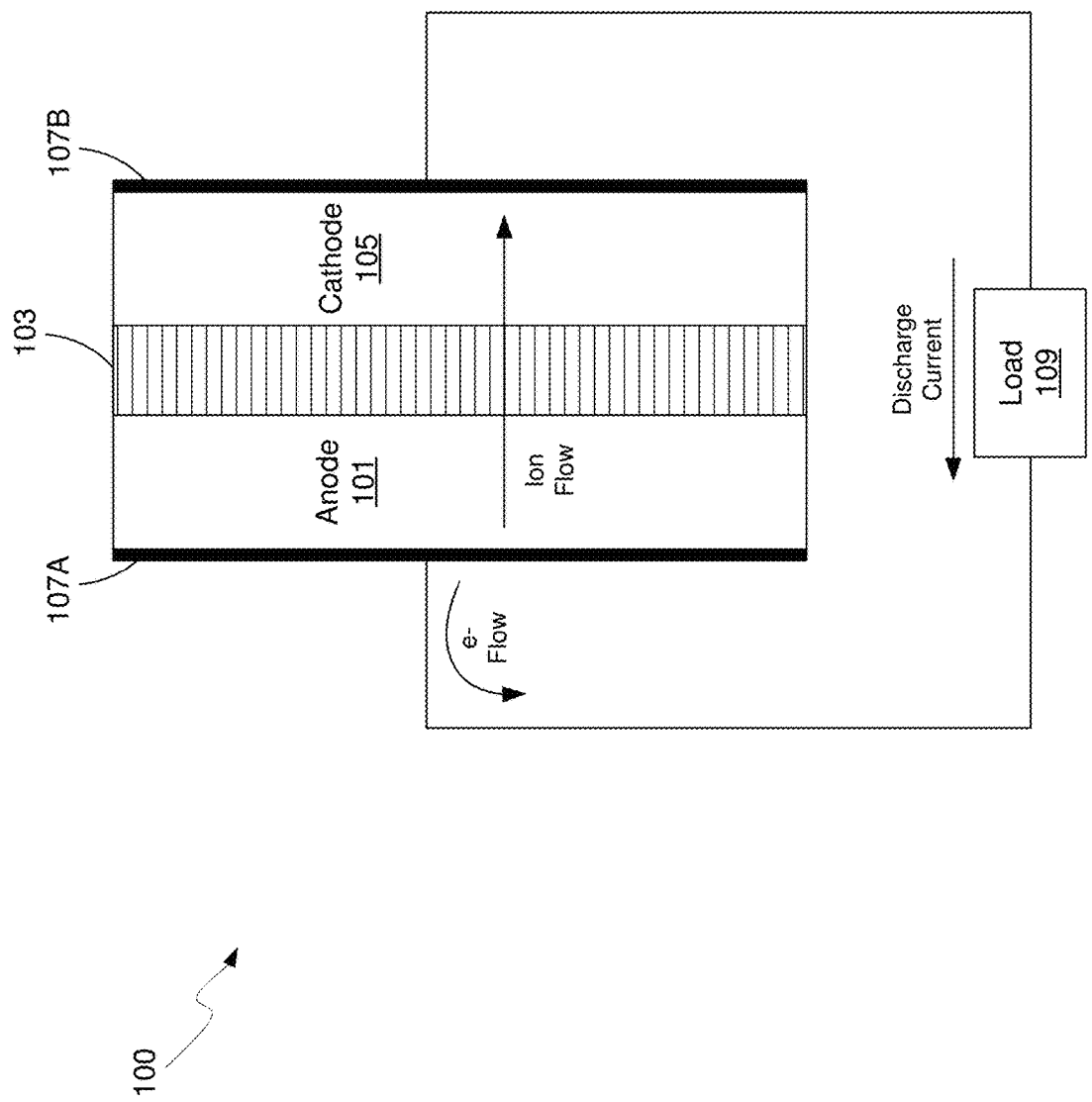
FIG. 1 is a diagram of a battery with configured anode expansion, in accordance with an example embodiment of the disclosure.

FIG. 1 is a diagram of a battery with configured anode expansion, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to the expansion of anodes is to configure the expansion that occurs with lithiation to be anisotropic, such that the expansion occurs in a desired direction. For example, if a cell can withstand some expansion in the z-direction (thickness of the anode), then the expansion may be configured to be minimized in the x- and y-directions. Conversely, if the cell can withstand lateral x- and y-direction expansion but not z-direction expansion, the anode expansion can be configured to minimize z-direction (thickness) expansion. Anode expansion can be controlled with the current collector foil thickness, the foil strength, the type of active material lamination process, and the roughness of the foils. This is described further with respect to FIGS. 2-7.

Figure 2:
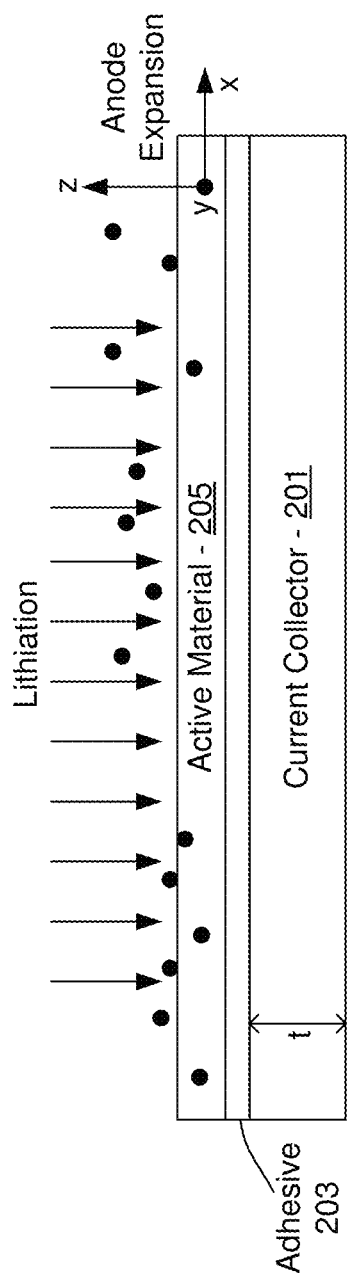
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there is shown a current collector 201, adhesive 203, and an active material 205. It should be noted that the adhesive 203 may or may not be present depending on the type of anode fabrication process utilized, as the adhesive is not necessarily present in a direct coating process. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material 205 may be coupled to the current collector 201 using the adhesive 203. The current collector 201 may comprise a metal film, such as copper, nickel, or titanium, for example, although other conductive foils may be utilized depending on desired tensile strength.

FIG. 2 also illustrates lithium particles impinging upon and lithiating the active material 205. The lithiation of silicon-dominant anodes causes expansion of the material, where horizontal expansion is represented by the x and y axes, whereas thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 μm thick, 20 μm for copper, for example, while thinner foils may be less than 10 μm, such as 5-6 μm thick or less in copper.

In another example scenario, when the current collector 201 is thinner, on the order of 5-6 μm or less for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, in instances where adhesive is utilized, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

TABLE 1 illustrates x- and y-direction expansion of anodes with different collector foil thickness and type of copper

| Material | Thickness (μm) | X-Expansion (%) | Y-Expansion (%) |
|---|---|---|---|
| C coated Cu | 10 | 0.44 | 0.47 |
| Cu A | 10 | 1.64 | 1.57 |
| Cu B | 10 | 1.97 | 1.90 |
| Cu C | 10 | 1.55 | 1.48 |
| Cu D | 10 | 1.86 | 1.78 |
| Cu E | 6 | 3.30 | 3.01 |
| Cu F | 6 | 4.50 | 3.94 |
| Cu G | 6 | 2.00 | 1.70 |

TABLE 1-continued

As illustrated in the table, as the copper foil thickness decreases, the expansion in the x- and y-directions increases and that adding a carbon coating on the copper foil may decrease expansion. This may be due to surface roughening, as illustrated further with respect to FIGS. 4-6.

Figure 3A:
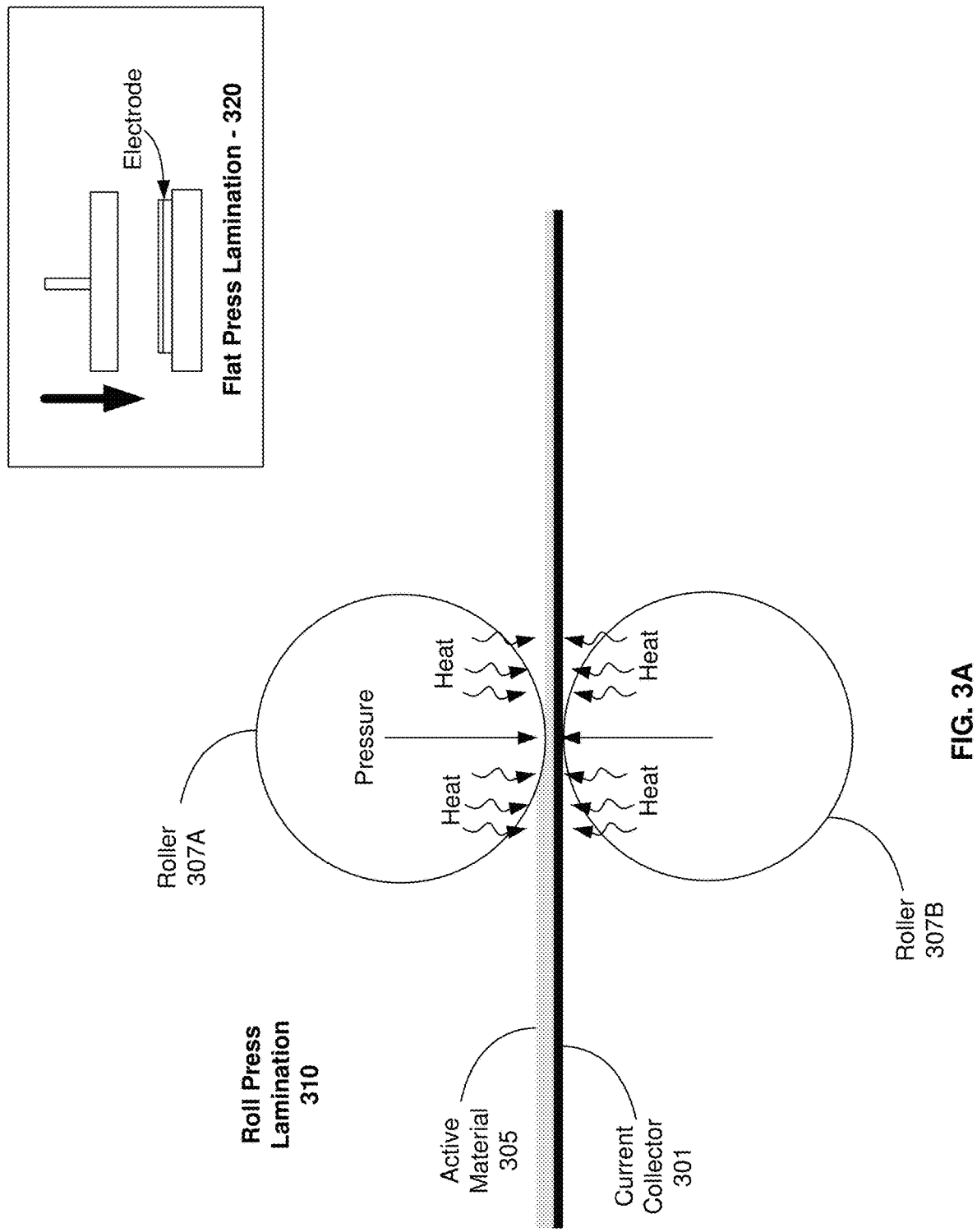
FIG. 3A illustrates roll press and flat press of anode active material, in an example embodiment of the disclosure.

FIG. 3A illustrates roll press and flat press of anode active material, in an example embodiment of the disclosure. Referring to FIG. 3A, there is shown roll press lamination 310 comprising a current collector 301, active material 305, and rollers 307A and 307B. The current collector 301 and the active material 305 may be similar to the current collector 201 and active material 205 described with respect to FIG. 2. The rollers 307A and 307B may comprise rigid cylindrical structures for applying a configurable pressure to material passed between them in a lamination process. It should be noted that while FIG. 3A shows active material on one side, the disclosure is not so limited, as the roll press process applies to double-sided foils too.

Heat may be applied to the materials being laminated using heating elements in the rollers 307A and 307B, or from external heat sources. Roll press lamination may result in significantly reduced x- and y-direction expansion as compared to flat press lamination 320 shown in the inset of FIG. 3A. In flat press lamination, flat surfaces are pressed together to apply pressure to the electrode layers. Expansion of anodes formed by roll press lamination 310 is compared to flat press lamination 320 in FIG. 3B.

The roll press lamination process thus has variables of pressure and temperature, which can impact the anisotropic expansion of silicon-dominant anodes formed in this manner. For example, roll press laminated anodes have higher anisotropic expansion (reduced x- and y-direction expansion, higher z-direction expansion) with lower temperature and higher pressure during the roll press lamination process. In addition, the amount of solvent before, during, and after lamination impacts the expansion of the layer, which may be tied to the temperature employed during lamination. A higher amount of residual solvent may remain before and during lamination for roll press. After lamination, there is no measurable difference in solvent residual between the roll press and flat press processes.

Figure 3B:
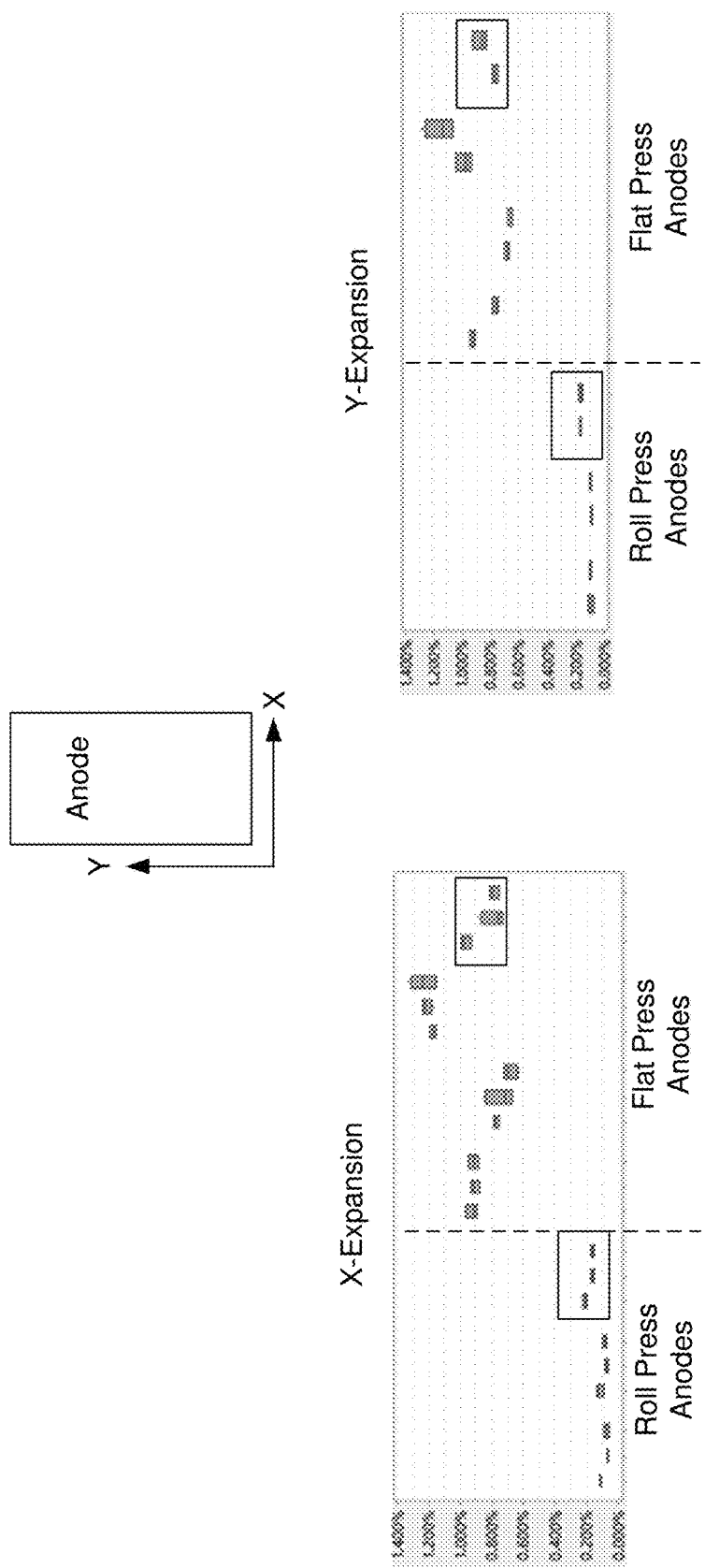
FIG. 3B illustrates lateral expansion for roll press and flat press lamination anodes, in accordance with an example embodiment of the disclosure.

FIG. 3B illustrates lateral expansion for roll press and flat press lamination anodes, in accordance with an example embodiment of the disclosure. Referring to FIG. 3B, there is shown x-direction and y-direction expansion of silicon-dominant anodes of various thicknesses and sources, where x and y-directions are illustrated in the inset above the plots. As can be seen, roll press laminated anodes demonstrate significantly lower lateral (x- and y-direction) expansion as compared to flat press laminated anodes. The boxed data points in each figure are for otherwise identical anodes with 10 μm foil current collectors, but roll press laminated and flat press laminated, thereby demonstrating that the lamination method has a strong influence on anode expansion. The roll-press laminated anodes demonstrate significantly reduced expansion and no cracking down to 8 μm.

Figure 4:
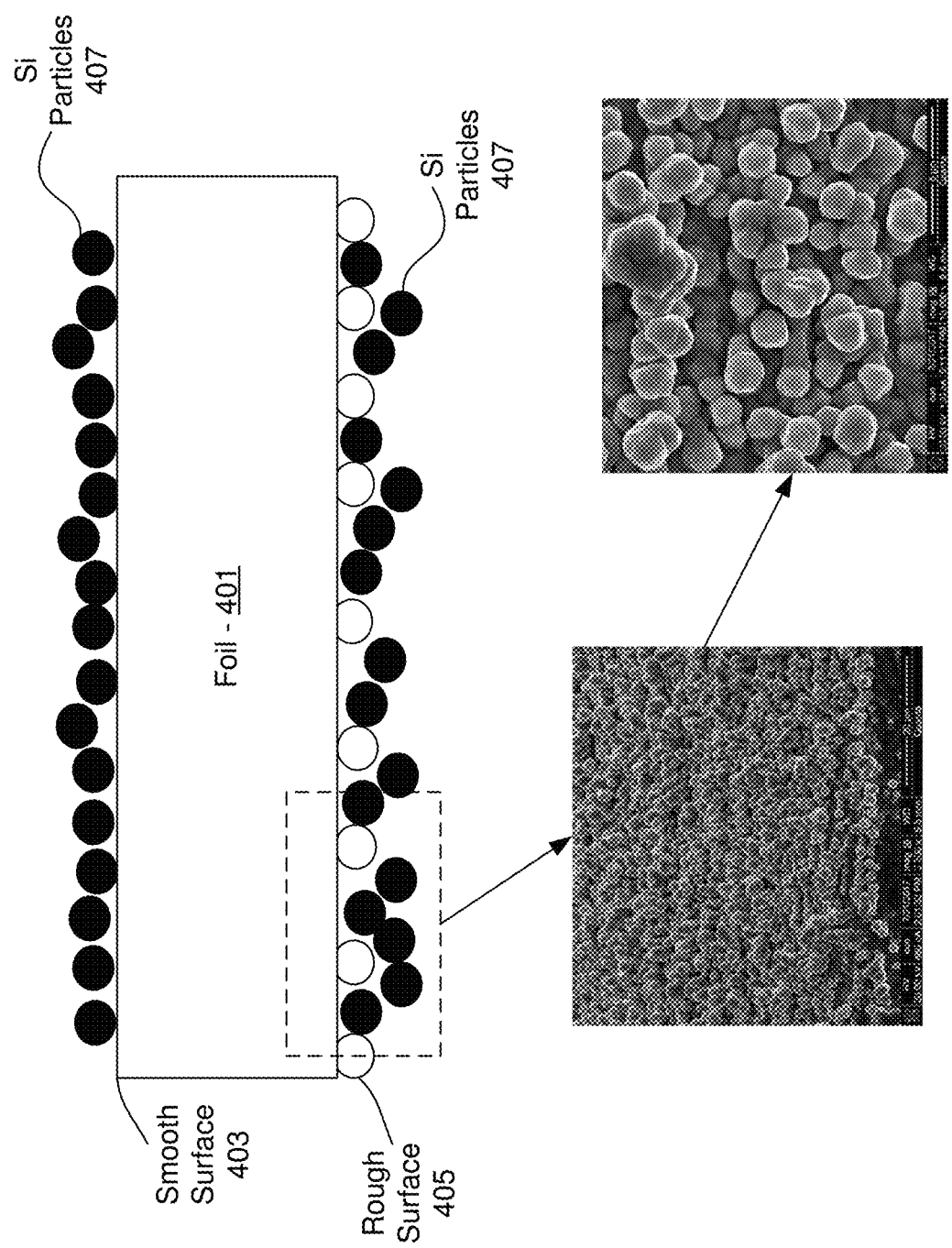
FIG. 4 illustrates different foil surfaces for anode current collectors, in accordance with an example embodiment of the disclosure.

FIG. 4 illustrates different foil surfaces for anode current collectors, in accordance with an example embodiment of the disclosure. Referring to FIG. 4, there is shown a foil 401 with a smooth surface 403 and a rough surface 405. There is also shown silicon particles 407 from the anode active material. The size and shape of structures on the foil 401 are merely for illustrative purposes, as surface roughness or silicon particles may comprise any shape or size. In an example embodiment, the rough surface 405 may comprise roughened foil material, such as a copper foil with copper hills and valleys. In another example, the rough surface 405 may comprise a coating such as carbon particles, carbon fibers, nanofibers, or rods for example, coated on the surface of the foil 401.

The insets below the foil 401 in FIG. 4 are scanning electron microscope (SEM) images of the rough surface 405, where the particle sizes are on the order of a few microns. Very strong adhesion may result in laminated anodes due to the strong adhesion between the active material layer and the foil with roughened surface. This bond allows the foil to help constrain the expansion of the active material layer. For anodes that are directly coated onto a foil surface and then heat-treated (pyrolyzed), the contact is weaker, so a roughened copper helps with the adhesion by increasing surface area of the interface, which helps the expanding active material layer be constrained by the foil.

In cells where expansion in the z-direction is less desirable than x-y, a smooth surface with roughness features smaller than a few microns, for example, may be utilized thereby allowing more x-y expansion and less z-direction expansion, illustrating how the anisotropic expansion of the anode active material may be configured.

Figures 5A, 5B:
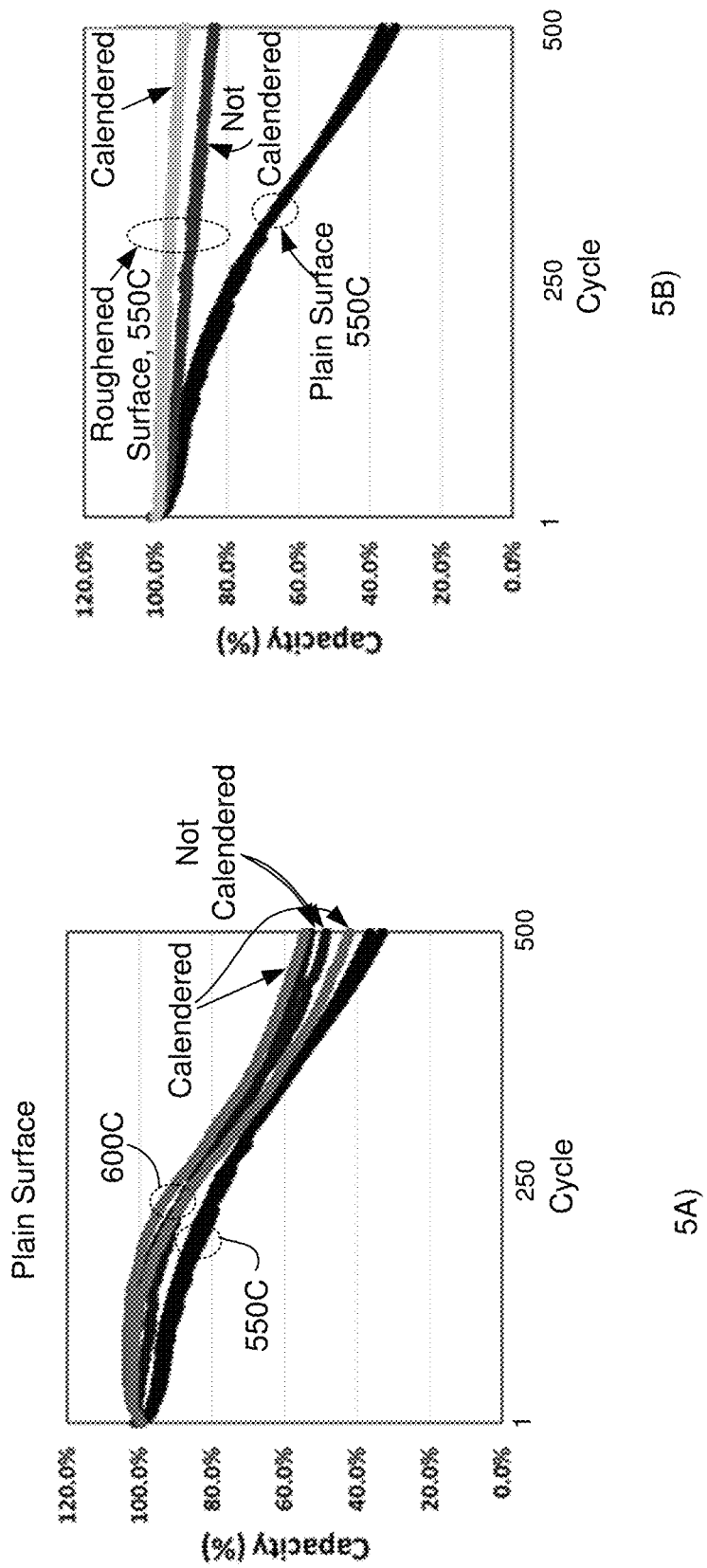
FIGS. 5A and 5B illustrate cycle life for cells with different current collectors and pyrolysis temperatures, in accordance with an example embodiment of the disclosure.

FIGS. 5A and 5B illustrate cycle life for cells with different current collectors and pyrolysis temperatures, in accordance with an example embodiment of the disclosure. Referring to FIG. 5A, there is shown cycle life for anodes formed on a "plain" surface copper foil (not roughened). The silicon-dominant anodes use PAI as a binder and are direct coated on copper foils, with some of them calendered, where a series of hard pressure rollers may be used to finish the film/substrate into a smoother and denser sheet of material, while others were not. As shown by the labels, some of the anodes are pyrolyzed at 550° C. and others at 600° C. The cells with plain surface current collector all lost 40-60% of their capacity over 500 cycles.

Referring to FIG. 5B, there is shown cycle life for anodes formed on plain and roughened copper foil. The plain surface foil anodes with 550° C. pyrolysis correspond to similar cells from FIG. 5A, but the roughened copper foil cells show significantly improved cycle life, retaining 85-95% of their capacity over 500 cycles.

Table 2 below shows x- and y-direction expansion for anodes with roughened copper foils after six formation cycles. For non-roughened foils, the average expansion is 2-3%, and as can be seen in the table, the expansion averages are in the 1.3-1.5% range for roughened foil anodes.

TABLE 2

X and Y Expansion of a Roughened Foil Surface Anode

| Anode | X1 | X2 | X3 | Y1 | Y2 |
|---|---|---|---|---|---|
| 1 | 1.48 | 1.41 | 1.28 | 1.28 | 1.27 |
| 2 | 1.54 | 1.39 | 1.31 | 1.24 | 1.34 |
| 3 | 1.50 | 1.41 | 1.34 | 1.31 | 1.34 |
| 4 | 1.58 | 1.56 | 1.48 | 1.28 | 1.33 |
| 5 | 1.65 | 1.55 | 1.42 | 1.37 | 1.49 |
| 6 | 1.44 | 1.47 | 1.37 | 1.36 | 1.37 |
| 7 | 1.56 | 1.47 | 1.33 | 1.33 | 1.41 |

TABLE 2-continued

X and Y Expansion of a Roughened Foil Surface Anode

| Anode | X1 | X2 | X3 | Y1 | Y2 |
|---|---|---|---|---|---|
| 8 | 1.55 | 1.45 | 1.32 | 1.35 | 1.41 |
| 9 | 1.54 | 1.47 | 1.33 | 1.26 | 1.44 |
| 10 | 1.45 | 1.45 | 1.29 | 1.20 | 1.29 |
| 11 | 1.39 | 1.38 | 1.26 | 1.27 | 1.33 |
| 12 | 1.44 | 1.37 | 1.23 | 1.07 | 1.22 |
| AVG | 1.51 | 1.45 | 1.33 | 1.27 | 1.35 |

Figure 6:
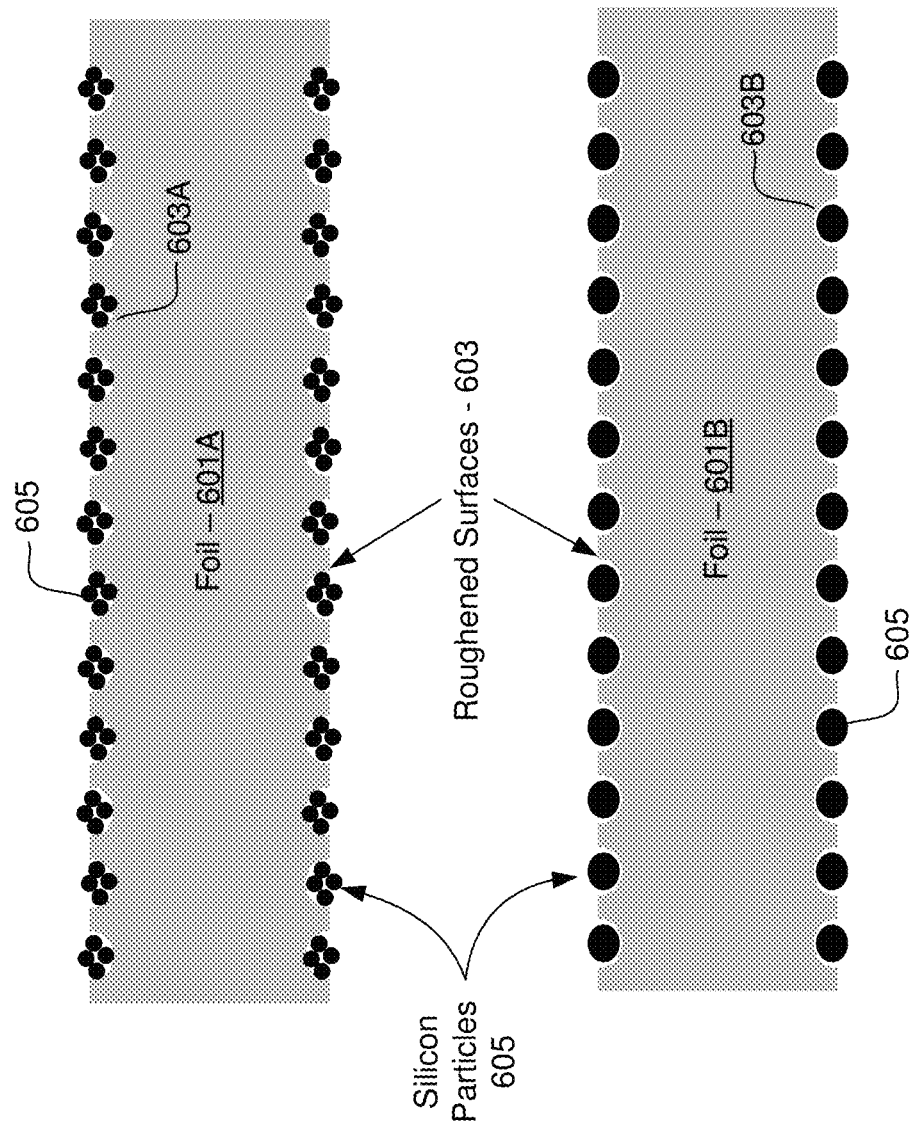
FIG. 6 illustrates roughened foils formed by etching, in accordance with an example embodiment of the disclosure.

FIG. 6 illustrates roughened foils formed by etching, in accordance with an example embodiment of the disclosure. Referring to FIG. 6, there are shown foils 601A and 601B where material has been removed to form etch features 603A and 603B. The etch features 603A and 603B create an artificial roughening of the surface by periodically removed copper, in the example of a copper foil, leaving etch pits in the surface where silicon particles may embed. As shown with foil 601A, the etch features 603A may be large enough that multiple silicon particles may embed within, as compared to foil 601B where the etch features 603B may be large enough for just a single particle.

In an example scenario, the etch features 603A may range from 1 μm across at the surface of the foil 601A to 50 μm, for example, where the D50 size of the silicon particles is on the order of 5-10 μm. The etch features 603B may range from 5-15 μm, for example.

Figure 7:
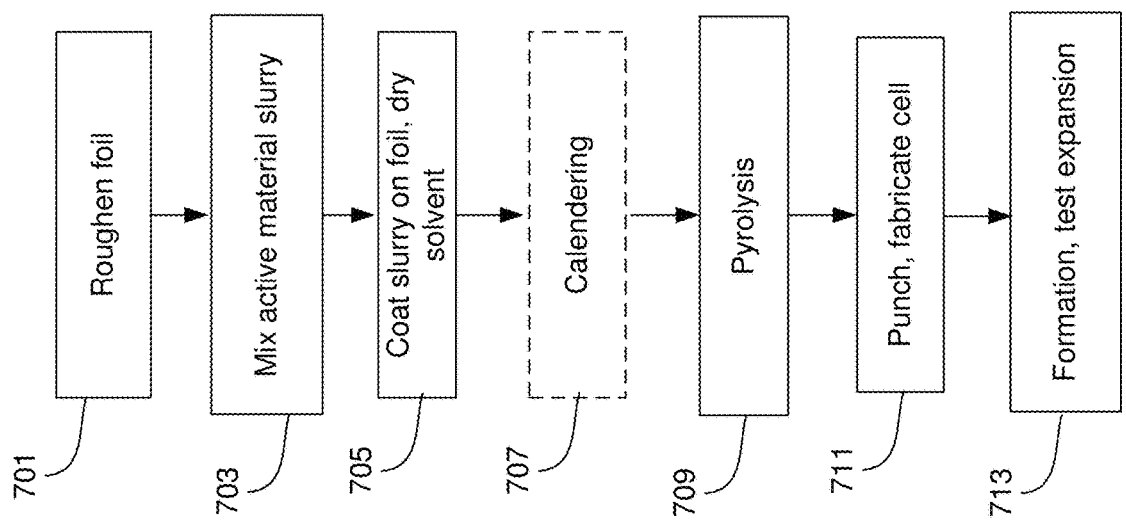
FIG. 7 is a flow diagram of a process for more anisotropic expansion in a silicon anode, in accordance with an example embodiment of the disclosure.

FIG. 7 is a flow diagram of a process for more anisotropic expansion in a silicon anode, in accordance with an example embodiment of the disclosure. While one process to fabricate composite electrodes comprises physically mixing the active material, conductive additive, and binder together, and coating it directly on a current collector, this process employs a high-temperature pyrolysis process coupled with a roll pressing (calendering) process. This example process comprises a direct coating process in which an anode slurry is directly coated on a copper foil using a binder such as CMC, SBR, Sodium Alginate, PAI, PAA, PI and mixtures and combinations thereof. Another example process comprises forming the active material on a substrate and then transferring to the current collector. The process described here is for increased anisotropy in anode expansion, where z-direction expansion is increased while x-y expansion is decreased.

In step 701, a roughened foil may be obtained or fabricated by etching the surface. In addition, a thicker foil may be used to reduce the x-y expansion of the anode during lithiation. Furthermore, a stronger material, such as nickel, may be used to further restrict lateral expansion. In step 703, the raw electrode active material may be mixed using a binder/resin (such as PI, PAI), solvent, and conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon powder with a 10-20 μm particle size, for example, may then be dispersed in polyamic acid resin (15% solids in N-Methyl pyrrolidone (NMP)) at, e.g., 800-1200 rpm for, e.g., 5-20 minutes, and then the conjugated carbon/NMP slurry may be added and dispersed at, e.g., 1800-2200 rpm for, e.g., 5-20 minutes to achieve a slurry viscosity within 2000-4000 cP and a total solid content of about 30%.

In step 705, the slurry may be coated on the foil at a loading of, e.g., 3-4 mg/cm$^2$, which may undergo drying resulting in less than 15% residual solvent content. In step

707, the foil and coating proceeds through a roll press for calendering. The pressure and temperature utilized during roll press may increase the anisotropy of anode expansion.

In step 709, the active material may be pyrolyzed by heating to 500-800 C such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 711. If done in roll form, the punching is performed after the pyrolysis process. The punched electrode may then be sandwiched with a separator and cathode with electrolyte to form a cell. In step 713, the cell may be subjected to a formation process, comprising initial charge and discharge steps to lithiate the anode, with some residual lithium remaining. The expansion of the anode may be measured to confirm the highly anisotropic nature of the expansion, i.e., little x-y expansion and primarily z-direction expansion.

Figure 8:
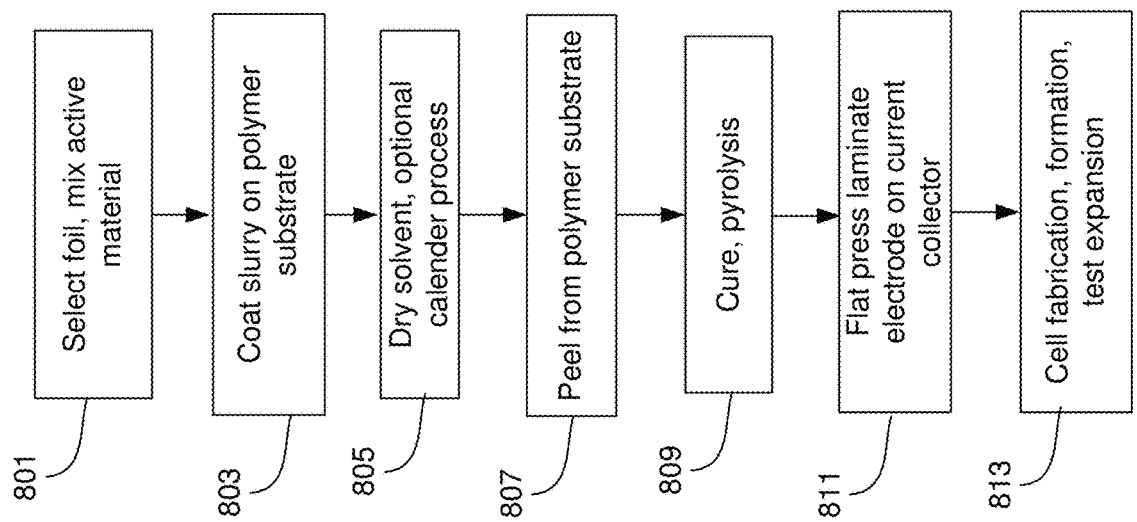
FIG. 8 is a flow diagram of a process for less anisotropic expansion in a silicon anode, in accordance with an example embodiment of the disclosure.

FIG. 8 is a flow diagram of a process for less anisotropic expansion in a silicon anode, in accordance with an example embodiment of the disclosure. While the previous process to fabricate composite anodes physically mixed the active material, conductive additive, and binder together and coated directly on a current collector, this process employs a high-temperature pyrolysis process coupled with a flat press lamination process. After the raw electrode materials are mixed, they may be coated on a substrate. The active layer may then be peeled into sheets, cut into desired size, cured, and undergo pyrolysis at high-temperature to form an anode coupon with high Si content. The anode coupon is then flat press laminated on an adhesive-coated current collector.

This process is shown in the flow diagram of FIG. 8, starting with step 801 where a thin metal foil, e.g., less than 10 μm, and comprising copper. In addition, the foil may be smooth, without any added roughness, to allow x-y expansion. The active material may be mixed with a binder/resin such as polyimide (PI) or polyamide-imide (PAI), solvent, the silosilazane additive, and optionally a conductive carbon. In an example scenario, silicon powder (5-20 μm particle size, for example) may be dispersed in NMP and silosilazane solution with the amount of silosilazane being 1.2% with respect to silicon. Polyamic acid resin (15% solids in NMP) may be added to the mixture at 500 rpm for 10 minutes, and further dispersed between 700-1000 rpm for several hours to achieve a slurry viscosity within 1500-3000 cP (total solid content of about 30%).

In step 803, the slurry may be coated on a polymer substrate, such as polyethylede terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 805. An optional calendering process nay be utilized where a series of hard pressure rollers may be used to finish the film/substrate into a smoothed and denser sheet of material.

In step 807, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 809 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 811, the pyrolyzed material may be flat press laminated on the current collector, where a thin copper foil, e.g., 6 μm or less, may be coated with polyamide-imide with a nominal loading of 0.3-0.6 mg/cm$^2$ (applied as a 6 wt % varnish in NMP, dried 10-20 hours at 100-120° C. under vacuum). The silicon-carbon composite film may be laminated to the coated copper using a heated hydraulic press (30-90 seconds, 250-350° C., and 3000-5000 psi), thereby forming the finished silicon-composite electrode.

In step 813, the electrode may then be sandwiched with a separator and cathode with electrolyte to form a cell. The cell may be subjected to a formation process, comprising initial charge and discharge steps to lithiate the anode, with some residual lithium remaining. The expansion of the anode may be measured to confirm the less anisotropic (more isotropic) nature of the expansion, i.e., allowed x-y expansion as compared to the process of FIG. 7. The thin and smooth foil and flat press lamination result in more x-y expansion than anodes made from thick and roughened foil with roll press lamination.

In an example embodiment of the disclosure, a method and system is described for anisotropic expansion of silicon-dominant anodes. The battery may comprise a cathode, an electrolyte, and an anode, where the anode may comprise a current collector and an active material on the current collector. An expansion of the anode during operation may be configured by a roughness of the current collector, a thickness of the current collector, a metal used for the current collector, and/or a lamination process that adheres the active material to the current collector.

The expansion of the anode may be more anisotropic for thicker current collectors. A thicker current collector may be 10 μm thick or greater. The expansion of the anode may be more anisotropic for more rigid materials used for the current collector. A more rigid current collector may comprise nickel and a less rigid current collector may comprise copper. The expansion of the anode may be more anisotropic for a rougher surface current collector. The roughness of the anode may be configured by etching features in the current collector. The etched features may range from 1 to 50 μm across. The expansion of the anode may be more anisotropic if the active material is roll press laminated to the current collector. The expansion of the anode may be less anisotropic if the active material is flat press laminated to the current collector.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of forming a battery, the method comprising:
    forming a battery comprising a cathode, an electrolyte, and an anode, the anode comprising a copper current collector and an active material on the current collector, the active material having a silicon content of 50% or more by weight; and
    configuring an expansion of the anode during operation, wherein the copper current collector comprises copper-based material;
        wherein the expansion of the anode during operation is controlled or adjusted based on a selection of the copper-based material used for the current collector to ensure that the anode expands less in one of the x-y directions and the z-direction while expanding more in a different one of the x-y directions and the z-direction, and
        wherein the selection of the copper-based material comprises selecting among a plurality of different types or options for the copper-based material.

2. The method according to claim 1, wherein the anode expands less in lateral directions and expands more in a z-direction with a more rigid material as compared to a less rigid material, wherein the vertical direction is with respect to a top surface of the anode.

3. The method according to claim 1, wherein a more rigid current collector comprises nickel.

4. The method according to claim 1, wherein a more rigid current collector comprises copper coated with carbon.

5. The method according to claim 4, wherein expansion of the anode in lateral directions is less than 0.5% for copper coated with carbon.

6. The method according to claim 1, wherein the current collector comprises a copper foil.

7. The method according to claim 6, further comprising applying the active material to the copper current collector using flat pressing, and wherein expansion of the anode in lateral directions is less than 4% when the active material is flat pressed on the copper current collector.

8. The method according to claim 6, further comprising applying the active material to the copper current collector using roll pressing, and wherein expansion of the anode in lateral directions is less than 2% when the active material is roll pressed on the copper current collector.

* * * * *